United States Patent
Bacher et al.

(10) Patent No.: US 6,854,674 B2
(45) Date of Patent: Feb. 15, 2005

(54) DEVICE FOR COMMINUTING PLASTIC WASTE MATERIAL

(76) Inventors: Helmut Bacher, Bruck/Hausleiten 7, A-4490 St. Florian (AT); Helmuth Schulz, Badstrasse 20, A-4490 St. Florian (AT); Georg Wendelin, Waldbothenweg 84, A-4033 Linz (AT)

( * ) Notice: Subject to any disclaimer, the term of this patent is extended or adjusted under 35 U.S.C. 154(b) by 136 days.

(21) Appl. No.: 10/204,795
(22) PCT Filed: Jan. 14, 2002
(86) PCT No.: PCT/AT02/00010
§ 371 (c)(1), (2), (4) Date: Aug. 23, 2002
(87) PCT Pub. No.: WO02/055205
PCT Pub. Date: Jul. 18, 2002

(65) Prior Publication Data
US 2003/0019963 A1 Jan. 30, 2003

(30) Foreign Application Priority Data
Jan. 15, 2001 (AT) .............................................. 57/2001

(51) Int. Cl.[7] .............................................. B02C 18/22
(52) U.S. Cl. ......................... 241/65; 241/243; 241/282
(58) Field of Search ............................... 241/252, 242, 241/243, 224, 23, 65

(56) References Cited

U.S. PATENT DOCUMENTS 1,359,016 A  * 11/1920  Baker ........................ 241/136
4,840,317 A  *  6/1989  Henrich ...................... 241/282
6,510,880 B2 *  1/2003  Arasmith .................... 144/373

FOREIGN PATENT DOCUMENTS

| DE | 40 26 795 A1 | 3/1991 |
| DE | 297 08 328 U1 | 7/1997 |
| DE | 199 16 800 A1 | 10/2000 |

* cited by examiner

Primary Examiner—Mark Rosenbaum
(74) Attorney, Agent, or Firm—Townsend and Townsend and Crew LLP

(57) ABSTRACT

An apparatus for comminuting waste of synthetic plastic material has a housing (1) in which at least one rotor (2) is bearingly supported for rotation around a preferably horizontal axis by a motor. The rotor (2) is provided on its periphery with comminuting tools acting onto the supplied material, in particular knives 6, counter tools, in particular counter knives (8), assigned to the knives, being stationarily disposed within the housing (1) forming a supply well (7) of great volume. The material disposed within the supply well (7) is pressed against the rotor (2) by a supply arrangement which has at least two slides (17, 18) superimposed above each other and supplying the material to the rotor (2). The slides are independently from each other moveable against the rotor (2) or away from it. The front surface of the lowermost slide (17) facing the rotor (2) defines with the tangent (44) to the enveloping circle (26) of the comminuting tools (6) carried by the rotor (2) a substantially wedge-shaped intake gap (24) for the material to be comminuted. This intake gap (24) narrows in the downward direction.

17 Claims, 2 Drawing Sheets

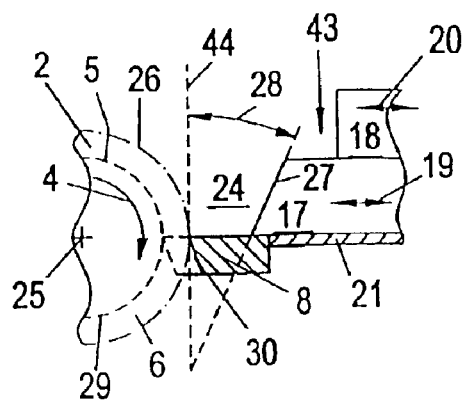
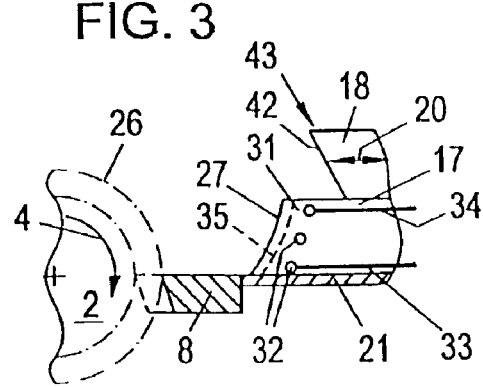
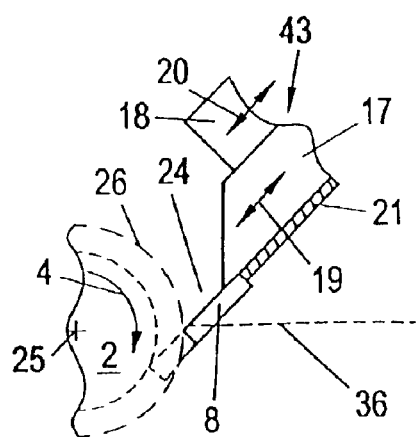
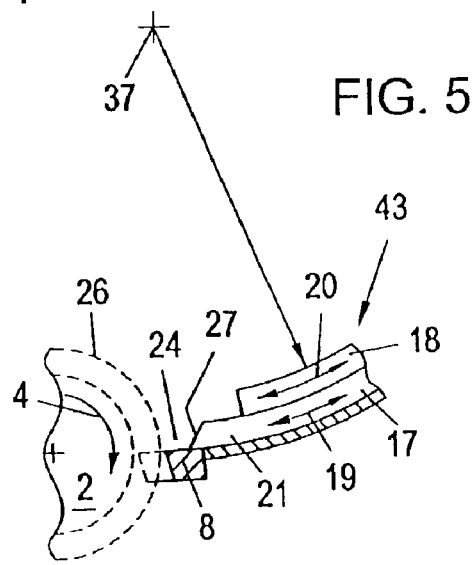
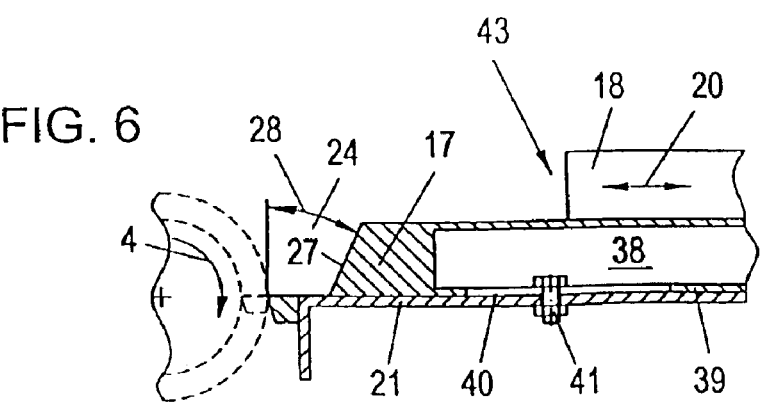

DEVICE FOR COMMINUTING PLASTIC WASTE MATERIAL

BACKGROUND OF THE INVENTION

The invention relates to an apparatus for comminuting waste of synthetic plastic material, comprising a housing in which at least one rotor is bearingly supported for rotation by a motor around a preferably horizontal axis, which rotor on its periphery is provided with comminuting tools, in particular knives, acting onto the supplied material. Counter tools, in particular counter knives, are stationarily disposed within the housing, which forms a supply shaft of great volume. The counter tools are assigned to the comminuting tools. The apparatus also has supply means with a slide member pressing the material disposed within the supply shaft against the rotor.

Comminuting apparatus are known in a plurality of embodiments as shown, for example, by EP 605 382 B1, AT 398 712 B. Investigations by the applicants have shown that the comminuting effect or, respectively, the throughput is highly dependent on the position of the slide member relative to the rotor. As soon as the slide member at its forward motion reaches a position relatively close to the rotor, the comminuting effect is increased and remains at a high level until the entire material dammed up between the rotor and the slide member is worked up. When the slide member is retracted in order to bring fresh material to be comminuted into the area between the rotor and the slide member, the comminuting efficiency of the apparatus decreases considerably. When the slide is again moved towards the rotor, the comminuting efficiency remains at a low level, as long as the distance between the rotor and the slide is still great. A high throughput of the apparatus is only obtained when the slide has reached a comparatively low distance from the rotor. An explanation for this is that the slide member in its position adjacent the rotor forms an intake gap for the material to be comminuted, which gap acts in the manner of a guide blade.

The described pulsating or varying throughput behavior is already of disadvantage within a mere comminuting machine, because the average throughput per time unit is low when compared with the maximum value. In particular of disadvantage are the circumstances, however, within a plant for comminuting synthetic plastic material, in which an extruder immediately follows the comminuting apparatus, because due to the uneven throughput of the comminuting machine, the extruder efficiency also varies considerably, so that the final products obtained at the extruder exit, for example within a forming plant, become highly uneven.

SUMMARY OF THE INVENTION

The invention has as an object to avoid these disadvantages and to improve a comminuting apparatus of the initially described kind so that the throughput per time unit of the apparatus is substantially made more even. The invention solves this task in that the feed means comprises at least two slide members that are superimposed above each other and supply the material to the rotor. The slide members are independently from each other moveable towards the rotor or away from it so that the front surface of the lowermost slide facing the rotor defines with the tangent to the enveloping circle of the comminuting tools carried by the rotor a substantially wedge-shaped intake gap for the material to be comminuted, which intake gap converges in a downward direction towards its lower end. The upper slide member or the upper slide members of this system of a plurality of slide members acts or act as an additional supply means which supplies fresh material to be comminuted to the wedge-shaped intake gap between the rotor and the front end of the lower slide member. Surprisingly, tests have shown that by this simple measure a substantial improvement of the throughput behavior of the apparatus can be obtained, presumably because as the lower end of the wedge-shaped intake gap narrows, the material to be comminuted is increasingly pressed against the rotor.

It is known from DE 196 14:030 A1 to provide within a comminuting machine for tough scraps of synthetic plastic material a closure plate in the upper region of a supply slide member, which closure plate can be advanced by a separate drive means into an operation position covering the comminuting cylinder. However, no additional material can still be supplied to the intake gap between the rotor and the slide member in this manner.

From DE 199 16 800 A1 an apparatus for comminuting of preferably plastic masses, in particular of wet clay, has become known in which within the comminuting space a reciprocable slide is disposed in front of the rotor. Since the wet clay may dam up within an intake hopper leading to the comminuting space, for loosening this material above the slide a further reciprocable slide is provided. However, such a construction cannot meet the above-mentioned problems occurring when synthetic plastic material waste is comminuted, mainly caused by the different shape of the gap existing between the rotor and the lower slide.

According to a preferred embodiment of the invention, the slide members superimposed above each other are guided contacting each other in parallel by guide means which, if desired, are inclined with respect to the horizontal direction. Slide members resting against each other facilitate construction of their guide means, because for example the top surface of the respective lower slide member can act as the bottom surface for guiding the respective upper slide member. By an inclination of the slide member paths, which may reach nearly a vertical disposition, different shapes of the wedge-shaped intake gap between the rotor and the lower slide member can be obtained and, as a consequence thereof, different supply conditions for the material to be comminuted.

Within the spirit of the invention, the slide members disposed above each other can be guided along guide means that are straight-lined or curved in the manner of an arc of a circle. Straight-lined guide means are of easier construction. However, as a rule, they show more special requirement in horizontal direction, which space is not always and everywhere unlimited at disposal. In this respect, slide members that are guided along an arc of a circle are more favorable.

Within the spirit of the invention, the lower slide member or the lowermost slide member can be fixed in its position relative to the rotor. Thereby a constant intake gap is obtained during the operation between the rotor and the front wall of the slide member facing it, into which intake gap the material to be comminuted is supplied by the feed means comprising the upper slide member or the upper slide members. The intake gap constitutes a space for a sufficient pad of material in order to keep a substantially constant throughput operation of the apparatus also during the retracting movement of at least one upper slide member.

Some of the synthetic plastic materials to be comminuted, in particular plastics materials to be recycled, act abrasively, in particular if the impurities contain grained solid material, for example sand or small stones. Therefore, the front surface of at least one lower slide member pressing the material to the rotor may be subjected to high wear. Therefore, it is suitable within the invention to form this front surface by an exchangeable end piece. This exchangeability can also enable one to provide different end pieces delimiting different intake gaps or, respectively, intake wedge angles with the rotor. Thereby, an adjustment to the particular kind of the material to be comminuted can be obtained.

The high stresses of the surface of a slide member facing the rotor have as a consequence that the front region of the slide member facing the rotor can heat up. Therefore, it is suitable to provide in this region of the slide member or, respectively, in its end piece channels for a cooling medium.

For an adaptation to different materials to be comminuted, within the spirit of the invention the front surface of at least one slide member facing the rotor can have a structure acting on the material to be drawn in, in particular, grooves. These grooves can extend straight-lined, therefore, in the direction of circulation of the comminuting tools, so that the material to be comminuted cannot escape sidewise. However, these grooves can also be disposed obliquely with respect to the direction of circulation, so that already within the cutting space or, respectively, in the region between the rotor and the slide members a component of motion of the material to be comminuted is created that is directed in an axial direction of the rotor. This can be made of use in order to obtain a material motion in a definite desired direction, for example away from the two front surfaces of the housing, therefore in a direction towards the axial central region of the rotor, or in direction towards a front end of the rotor. The latter construction is in particular suitable if the material comminuted by the rotor should be supplied to an extruder that is connected in axial direction to the rotor.

A particular favorable embodiment consists within the spirit of the invention in that at least one slide member is subdivided over the length of the rotor into a group of slides, the respective elements thereof, if desired, being driven to different movements relative to the rotor. Thereby, a pressure onto the material to be comminuted can be obtained that is different over the length of the rotor, which is advantageous. By a suitable program-control for the movements of the respective slide members, an adaptation to the quality of the respective material to be comminuted can be obtained.

In the drawings, embodiments of the subject matter of the invention are schematically shown.

BRIEF DESCRIPTION OF THE DRAWINGS

FIGS. 2 to 6 each show a construction variant for the disposal or, respectively, construction of the slide members.

DESCRIPTION OF THE PREFERRED EMBODIMENTS

Figure 1:
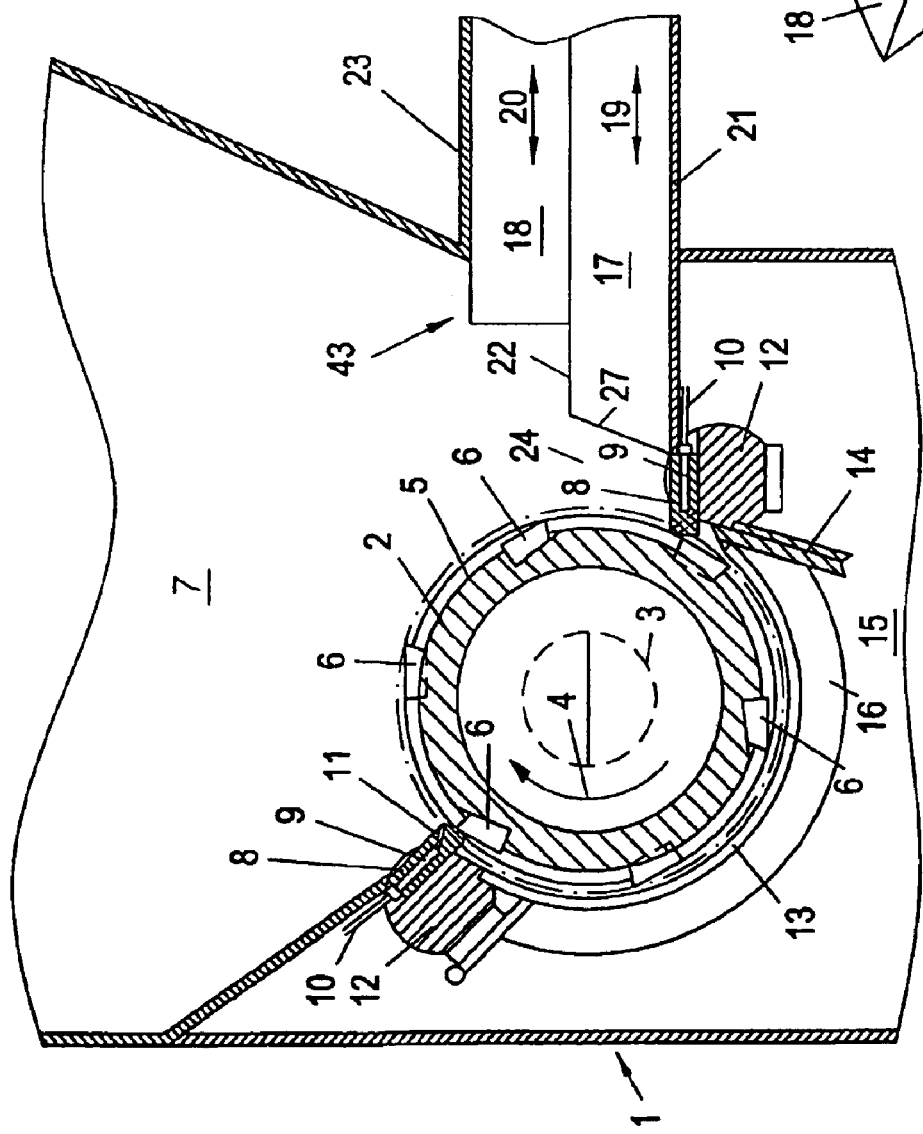
FIG. 1 shows the apparatus in a vertical section.

Within the embodiment according to FIG. 1, the framework forms a housing 1 in which a cylinder-shaped rotor 2 is bearingly supported for rotation around its horizontal axis by means of shaft ends 3 provided at its front ends. This rotor 2 is driven for rotation in the direction of the arrow 4 by a motor, not shown, and carries on its periphery 5, partially embedded therein, a plurality of comminuting tools formed in the manner of knives 6. These knives act onto the material to be comminuted, which is synthetic plastic material that is fed through a supply well 7 of great volume formed by the housing 1 and suitably narrowing in a downward direction towards the rotor 2. Counter tools stationarily fixed within the housing are assigned to the knives 6 and are formed as counter knives 8. These counter knives 8 may have cooled hollow spaces 9 to which a cooling medium, in particular cooling water, is supplied via lines 10. This cooling medium can be again conducted off the counter knives 8 and may be conducted in a closed circuit. However, the counter knives 8 may also be provided with nozzles 11 spraying the cooling medium onto the periphery 5 of the rotor 2, thereby cooling also the knives 6. The counter knives 8 can be inserted into rods 12 of the housing, to which a sieve 13 can be fixed through which the comminuted material falls into a collecting chamber 15 confined by a side wall 14. For strengthening it, the sieve 13 may be provided with flanges 16, which facilitate also fixing the sieve to the housing 1. This corresponds to a delivery of the material comminuted by the rotor 2 to below. However, the construction may be also so that this delivery of the comminuted material is made in an axial direction of the rotor 2, for example to an extruder, not shown, that follows the rotor 2, which later on is described more in detail.

Suitably, the knives 6 are disposed along knife circles on the rotor 2 and pass the correspondingly disposed counter knives 8 with a narrow shearing gap. As shown, the knives 6 may differently extend in radial direction from the axis of the rotor 2, whereby a better action onto the material to be comminuted is obtained. The knives 6 and the counter knives 8, therefore, are indentingly disposed, thus forming the shearing gaps. This material is supplied by means of a supply device 43 to the rotor 2 and is pressed to the rotor, which supply device in the embodiment shown comprises two slides 17, 18 disposed one above the other and independently reciprocable in the direction of the arrows 19 or 20 towards the rotor 2 or away from it. For this, the slides 17, 18 are connected to drive means of any known construction, not shown. The lower slide 17 is guided along a guide means 21 formed by a bottom plate of the housing 1. For the upper slide 18, a guide means is on the one hand formed by the top surface 22 of the lower slide 17, and on the other hand it is guided on its top by a guide means 23 formed by a cover plate. Both slides 17, 18, of course, are also laterally guided along walls of the housing 1. As FIG. 1 shows, the lower slide 17 together with the periphery 5 of the rotor 2 forms an intake gap 24 for the material to be comminuted, which intake gap 24 narrows from its upper end up to its lower end substantially in the shape of a wedge. Into this intake gap 24 the material is pressed by the lower slide 17 against the circulating knives 6. In order to avoid that the throughput of the apparatus decreases when the slide 17 is retracted or, respectively, when it is in a position that is comparatively remote from the rotor 2, the upper slide 18 is provided that is so moved that during these critical phases the material to be comminuted is conveyed towards the rotor 2. For these motions of the slides 17, 18, suitable control means can be provided, the programs of which are suitably variable in order to enable one to adapt to different qualities of the material to be comminuted.

In order to make the intake gap 24 as wedge-shaped as possible, the two slides 17, 18 can be disposed higher than is shown in FIG. 1. FIG. 2 shows an embodiment in which the upper edge of the guide means 21 is disposed substantially at the level of the axis 25 of the cylinder-shaped rotor 2. Thereby, a wedge-shaped intake gap 24 between the entire front surface 27 of the lower slide 17 and a tangent 44 to the enveloping circle 26 of the orbit of the knives 6 is obtained, which intake gap 24 narrows in a downward direction. This favors the intake of the material to be comminuted, in particular if the wedge angle 28 of this intake gap 24 is increased by a corresponding inclination of the front surface 27 of the lower slide 17. In FIG. 2 this angle 28 between the front surface 27 and the tangent 44 to the outer enveloping circle 26 of the knives 6 is shown. This holds for an analogous value of course also for the base circle 29 of the rotor 2 from which the knives 6 extend. The knives protrude into corresponding recesses 30 of the counter tool 8 so that narrow shearing gaps are formed.

Many materials to be processed, in particular synthetic plastic materials that are soiled by solid materials, for example mineral grains (sand or the like), may cause a considerable wear on the front surfaces of the slides 17, 18 facing the rotor, in particular of the lower slide 17. Therefore, it is of advantage to constitute this front surface 27 by an exchangeable end piece 31 (FIG. 3), preferably of a material that is highly resistant against wear. This exchangeability of the end piece 31 enables one to produce different wedge angles 28 or, different shapes of the wedge-like intake gap 24 by differently forming the front surface 27 of the several end pieces 31. Thus, it is possible, as the figures show, to give the intake gap over its height a different wedge angle, since, as FIG. 3 shows, the front surface 27 of the slide 17 does not have to be flat and can instead be curved. This enables one in a simple manner to adapt to particularities of the respective material to be comminuted.

Since in operation higher temperatures occur in the region of the slide 17 adjoining the surface 27, in particular in an end piece 31, it is preferred to provide this region, in particular the end piece 31, with conduits 32 for a cooling medium, which conduits 32 are connected to a supply line 33 and a removal line 34 for the cooling medium. Cooling media of any kind, which are known per se, may be used, in particular cold water.

A further adaptation to the respective material to be comminuted is obtained by providing the surface 27 of the lower slide 17 facing the rotor 2 with a structure, in particular with grooves 35 (FIGS. 3, 7), whereby an effect onto the material to be processed is obtained in the region of the intake gap 24. If these grooves 35 extend straight-lined or, respectively, in a vertical direction, i.e. in a direction extending perpendicularly to the direction of the axis 25 of the rotor 2, these grooves 35 avoid an escape of the material to be processed in an axial direction of the rotor 2 and, therefore, an increased intake action into the intake gap 24 is obtained. However, if these grooves 35 extend obliquely, i.e. if their longitudinal direction has a component extending in an axial direction of the rotor 2, then these grooves cause a conveyance of the material to be processed having a component of motion in that direction to which the respective lower end of the grooves 35 is directed. This component of motion of the processed material directed in an axial direction of the rotor 2 can be made use of to move this material towards the one front end of the rotor, for example in order to discharge there this material from the housing 1. Such a construction is particularly suitable if an intake opening of a screw extruder or the like is connected to this front end or, respectively, to the exit opening for the comminuted plastics material, since in this manner a coaxial construction of the comminuting apparatus and the extruder is possible. The comminuting apparatus and the extruder may then be driven by a common drive means.

Figure 7:
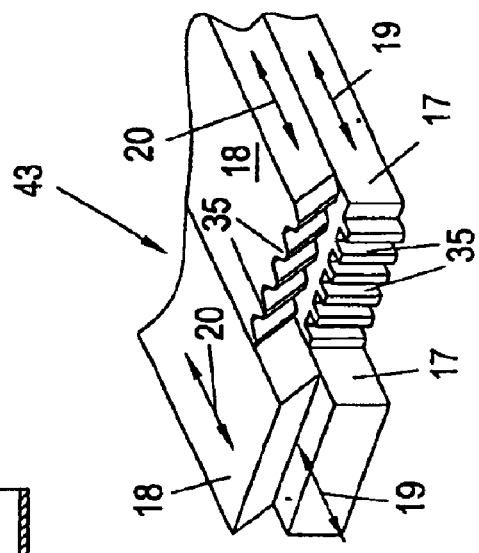
FIG. 7 shows a detail in an axonometric view.

As FIG. 7 shows, grooves 35 may be provided not only on the lower slide 17, but also on the upper slide 18.

Also the grooves extending in the front surfaces of the slides 17, 18 may be curved, corresponding to the curving, shown in FIG. 3, of the front surface 27 of the slide 17.

The embodiments shown in FIGS. 1 to 3 show a guide means for the slides 17, 18 that extends substantially in a horizontal direction. However, this is not compulsory. As FIG. 4 shows, the two slides 17, 18 may be also guided along a guide means 21 that is inclined with respect to the horizontal direction 36, whereby also the counter knives 8 may be disposed inclined. However, this is not compulsory. The two slides 17, 18 are guided along a guide means 21 that is also curved along an arc of a circle and the counter knife 8 may be correspondingly curved. The several arcs of a circle have a common center 37.

The embodiments according to FIGS. 4 and 5 can be combined insofar as the circular arced shape of the slides 17, 18 or, respectively, of the guide means 21 need not approach the rotor 2 in a horizontal direction, but can also approach it at an angle as is shown by the guide means 21 in FIG. 4.

For certain applications it can be of advantage to temporarily or continuously fix the lower slide 17 confining the intake gap 24 for processing a defined material in a constant manner. In order to adjust the lower slide 17 to the desired intake gap 24, this slide 17 can be provided with a hollow space 38 (FIG. 6), therefore box-shaped, and may be provided on its bottom wall 39 with a longitudinal slot 40 in which a screw 41 is guided when the slide 17 is adjusted, this screw 41 intersecting the guide means 21. If this screw 41 or, respectively, the nut disposed at the lower side of the guide means 21 is tightened, the slide 17 is fixed in its adjusted position. The longitudinal slot 40 should be sufficiently long in order to enable one to adjust the lower slide 17 in a sufficiently retracted position so that also very large clods of material can be processed. An alternative construction to that described heretofore consists in adjusting the slide 17 by means of a spindle or with a hydraulic drive means in the direction of the double arrow 19 and to fix it in the desired position. In this manner, a constant intake gap 24 is maintained during an operation step between the rotor 2 and the front wall 27 of the slide facing it. Into this intake gap 24 the plastics material to be comminuted is supplied by the supply means formed by the upper slide 18 or the upper slides.

Further, the front surface 42 (FIG. 3) of the upper slide 18 may be inclined with respect to the direction of its motion (double arrow 20) in a direction opposite to that of front surface 27 of the lower slide 17. This avoids an upward escape of the material to be processed into the funnel-shaped supply well 7 (FIG. 1) and, therefore, favors pressing the material to be processed against the rotor 2.

In all embodiments it is possible to subdivide the two slides 17, 18, disposed one above the other over the length of the rotor. This subdivision can be made for the lower slide 17 alone or for the upper slide 18 alone or for both slides 17, 18, and in the latter case the subdivision must not be the same for the two slides 17, 18. Then, two or more lower or, respectively, upper slides 17 or 18 are provided over the length of the rotor 2. Such a subdivision of the slides 17, 18 into two slide elements each is shown in FIG. 7 and it can be seen that the several slide elements need not be formed so that they are equal to each other. The movements of these slide elements can be controlled in a different manner, wherein the control program can be adapted to the respective conditions given.

As can also be seen, more than two slides can be superimposed one above the other.

As already stated, it is suitable to adapt the motions of the several slides to the material to be processed, for example by means of suitably programmed control means. In most cases it is suitable to let the upper slide or the upper slides advance to the lowermost slide, so that the material pressed by the lowermost slide against the rotor 2 cannot escape to above.

It has been shown that the following procedure is suitable for adjusting the intake gap 24: At first, all slides 17, 18 are retracted, and the front surfaces 27, 42 of these slides 17, 18 facing the rotor 2 are brought into a position in which they are at least substantially equally spaced apart from the rotor 2. Subsequently, the plastics material to be processed is introduced between these front surfaces 27, 42 and the rotor 2, whereupon all slides 17, 18 are advanced. The movements of the slides 17, 18 are controlled according to the plastics material to be comminuted.

What is claimed is:

1. Apparatus for comminuting synthetic plastic waste material, comprising a housing in which at least one rotor is bearingly supported for rotation by a motor around an axis, which rotor on its periphery is provided with comminuting tools acting on the supplied material, counter tools stationarily disposed within the housing forming a supply shaft of great volume being assigned to the comminuting tools, and further comprising a feed means having a slide member pressing the material disposed within the supply shaft against the rotor, the feed means comprising at least two slide members superimposed above each other and feeding the material to the rotor, which slide members are independently from each other moveable towards the rotor or away from it, wherein a front surface of a lowermost slide member facing the rotor defines with the tangent to the enveloping circle of the comminuting tools carried by the rotor a substantially wedge-shaped intake gap for the material to be comminuted, which intake gap narrows in a downward direction.

2. Apparatus according to claim 1, wherein the slide members superimposed above each other are contacting each other and are guided in parallel to each other by guide means.

3. Apparatus according to claim 2, wherein the guide means are inclined with respect to the horizontal direction.

4. Apparatus according to claim 1, wherein the slide members disposed above each other are guided along guide means that are straight-lined or curved in the manner of an arc of a circle.

5. Apparatus according to claim 1, wherein the lower slide member or the lowermost slide member can be fixed in its position relative to the rotor.

6. Apparatus according to claim 1, wherein the front surface of at least one slide member facing the rotor is formed by an exchangeable end piece.

7. Apparatus according to claim 6, wherein different end pieces define with the rotor at least one of different intake gaps and different intake wedge angles.

8. Apparatus according to claim 1, including channels for a cooling medium provided in a region of the front surface of at least one slide member facing the rotor.

9. Apparatus according to claim 8 wherein the channels for the cooling medium are arranged within the end piece.

10. Apparatus according to claim 1, wherein the front surface of at least one slide member facing the rotor has a structure acting onto the material to be drawn in.

11. Apparatus according to claim 10 wherein the structure acting onto the material includes grooves that extend in one of a straight line, a curved line and an obliquely inclined line.

12. Apparatus according to claim 1, wherein at least one slide member is subdivided over the length of the rotor into a group of slide members.

13. Apparatus according to claim 12, wherein the slide members are driven to different movements relative to the rotor.

14. Apparatus according to claim 1, wherein an axis of the rotor is disposed horizontally.

15. Apparatus according to claim 12, wherein the comminuting tools are knives.

16. Apparatus according to claim 1, wherein the counter tools are counter knives.

17. Apparatus according to claim 1 wherein the downward direction in which the gap converges coincides with a direction of rotation of the rotor.

* * * * *